United States Patent
Ramesh et al.

(10) Patent No.: US 12,061,642 B2
(45) Date of Patent: *Aug. 13, 2024

(54) METHODS TO PRESENT SEARCH KEYWORDS FOR IMAGE-BASED QUERIES

(71) Applicant: A9.com, Inc., Palo Alto, CA (US)

(72) Inventors: Sunil Ramesh, San Jose, CA (US); Shruti Sheorey, Mountain View, CA (US); Colin Jon Taylor, Orinda, CA (US); Mark Scott Waldo, Richmond, CA (US)

(73) Assignee: A9.com, Inc., Palo Alto, CA (US)

(*) Notice: Subject to any disclaimer, the term of this patent is extended or adjusted under 35 U.S.C. 154(b) by 249 days.

This patent is subject to a terminal disclaimer.

(21) Appl. No.: 16/900,362

(22) Filed: Jun. 12, 2020

(65) Prior Publication Data
US 2020/0311126 A1    Oct. 1, 2020

Related U.S. Application Data

(63) Continuation of application No. 15/084,256, filed on Mar. 29, 2016, now Pat. No. 10,706,098.

(51) Int. Cl.
*G06F 16/58* (2019.01)
*G06F 16/2457* (2019.01)
(Continued)

(52) U.S. Cl.
CPC ........ *G06F 16/58* (2019.01); *G06F 16/24578* (2019.01); *G06F 16/583* (2019.01);
(Continued)

(58) Field of Classification Search
CPC .. G06F 16/58; G06F 40/134; G06F 16/24578; G06F 16/583; G06Q 30/0625; G06Q 30/0641
(Continued)

(56) References Cited

U.S. PATENT DOCUMENTS 7,725,451 B2* 5/2010 Jing .................. G06F 16/58
707/707
7,872,669 B2* 1/2011 Darrell .................. G06F 16/951
348/207.1
(Continued)

OTHER PUBLICATIONS

Non-Final Rejection issued in U.S. Appl. No. 15/084,256 dated May 18, 2018.
(Continued)

*Primary Examiner* — Phong H Nguyen
(74) *Attorney, Agent, or Firm* — Hogan Lovells US LLP

(57) ABSTRACT

Techniques for providing recommended keywords in response to an image-based query are disclosed herein. In particular, various embodiments utilize an image matching service to identify recommended search keywords associated with image data received from a user. The search keywords can be used to perform a keyword search to identify content associated with an image input that may be relevant. For example, an image search query can be received from a user. The image search query may result in multiple different types of content that are associated with the image. The system may present keywords associated with matching images to allow a user to further refine their search and/or find other related products that may not match with the particular image. This enables users to quickly refine a search using keywords that may be difficult to identify otherwise and to find the most relevant content for the user.

18 Claims, 9 Drawing Sheets

(51) Int. Cl.
  *G06F 16/583*  (2019.01)
  *G06F 40/134*  (2020.01)
  *G06Q 30/0601* (2023.01)
(52) U.S. Cl.
  CPC ....... *G06F 40/134* (2020.01); *G06Q 30/0625* (2013.01); *G06Q 30/0641* (2013.01)
(58) Field of Classification Search
  USPC .......................................... 707/722, 736, 748
  See application file for complete search history.

(56) References Cited

U.S. PATENT DOCUMENTS

| | | | | |
|---|---|---|---|---|
| 8,204,897 | B1* | 6/2012 | Djabarov | G06F 16/9538 707/767 |
| 8,718,369 | B1 | 5/2014 | Tompkins | |
| 8,738,647 | B2 | 5/2014 | Menon | |
| 9,830,631 | B1 | 11/2017 | Dhua | |
| 2005/0114324 | A1* | 5/2005 | Mayer | G06F 16/951 707/999.003 |
| 2005/0162523 | A1* | 7/2005 | Darrell | G06F 16/951 707/E17.03 |
| 2007/0174269 | A1* | 7/2007 | Jing | G06F 16/58 707/999.005 |
| 2007/0286531 | A1* | 12/2007 | Fu | G06V 10/40 707/E17.03 |
| 2010/0094877 | A1* | 4/2010 | Garbe | G06F 16/93 707/E17.084 |
| 2010/0211602 | A1* | 8/2010 | Menon | G06F 16/583 707/E17.108 |
| 2011/0010367 | A1 | 1/2011 | Jockish | |
| 2011/0191321 | A1* | 8/2011 | Gade | G06F 3/14 707/769 |
| 2012/0117051 | A1* | 5/2012 | Liu | G06F 16/90335 707/707 |
| 2014/0280080 | A1* | 9/2014 | Solheim | G06F 16/9535 707/723 |
| 2015/0178392 | A1* | 6/2015 | Jockisch | G06F 16/9535 707/706 |
| 2017/0105040 | A1* | 4/2017 | Gao | H04N 21/4722 |

OTHER PUBLICATIONS

Final Rejection issued in U.S. Appl. No. 15/084,256 dated Dec. 20, 2018.
Non-Final Rejection issued in U.S. Appl. No. 15/084,256 dated Apr. 5, 2019.
Final Rejection issued in U.S. Appl. No. 15/084,256 dated Oct. 23, 2019.
Notice of Allowance issued in U.S. Appl. No. 15/084,256 dated Mar. 4, 2020.

* cited by examiner

METHODS TO PRESENT SEARCH KEYWORDS FOR IMAGE-BASED QUERIES

CROSS REFERENCE TO RELATED APPLICATION

This application is a continuation of, and accordingly claims the benefit of, allowed U.S. patent application Ser. No. 15/084,256, filed with the U.S. Patent and Trademark Office on Mar. 29, 2016, which is hereby incorporated herein by reference.

BACKGROUND

Electronic devices are increasingly enabling users to locate information in different ways. For example, a user wanting information about an item such as a book can perform a search to locate information about the book, or can navigate through the Website of an online retailer to locate a page of information about the book. In addition, a user can capture an image of a copy of the book using a camera of a portable computing device and cause that image to be matched against a database of images in order to identify the item and provide the user with information about that item. However, depending on the quality and subject matter of the search, it may be difficult to identify the product which the user is trying to match. For example, an image of a character from a movie may result in matches to a wide-variety of different types of products including movies, books, clothes, etc. Further, the character may be used by different brands, sub-brands, cross-brands, etc., that make it difficult to identify what item associated with the character the consumer is interested in. It is thus desirable to improve search and browse capabilities based on image searches.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to searching for products using image inputs. In particular, various embodiments utilize an image matching service to identify recommended search keywords associated with image data received from a user. The search keywords can be used to perform a keyword search to identify content associated with an image input that may be relevant to a user. For example, an image search query can be received from a user. The image search query may result in multiple different types of content being matched with the image. The system may present keywords associated with the matching images to allow a user to further refine their search and/or find other related products that may not match with the particular image. This enables users to quickly refine a search using keywords that may be difficult to identify otherwise and to find the most relevant content for the user.

Accordingly, embodiments allow a user to find the exact product they are interested in and/or to find other products related to an object that otherwise may be difficult to identify as being associated with a particular object of interest. Additionally, this allows users to find products associated with objects of interest where the quality of the picture is lower and the exact product is difficult to identify. For example, images that are not well-framed may result in image matches for products that are not related to and/or that are only somewhat related to the captured image. This may be confusing to the user and may provide results that are not relevant to the user. Accordingly, embodiments allow the user the ability to control which products are displayed and to remove incorrect or unrelated products that may match a portion of the image query by selecting a keyword that is directed to the product and/or products they are interested in.

Various other functions and advantages are described and suggested below as may be provided in accordance with the various embodiments.

Figure 1:
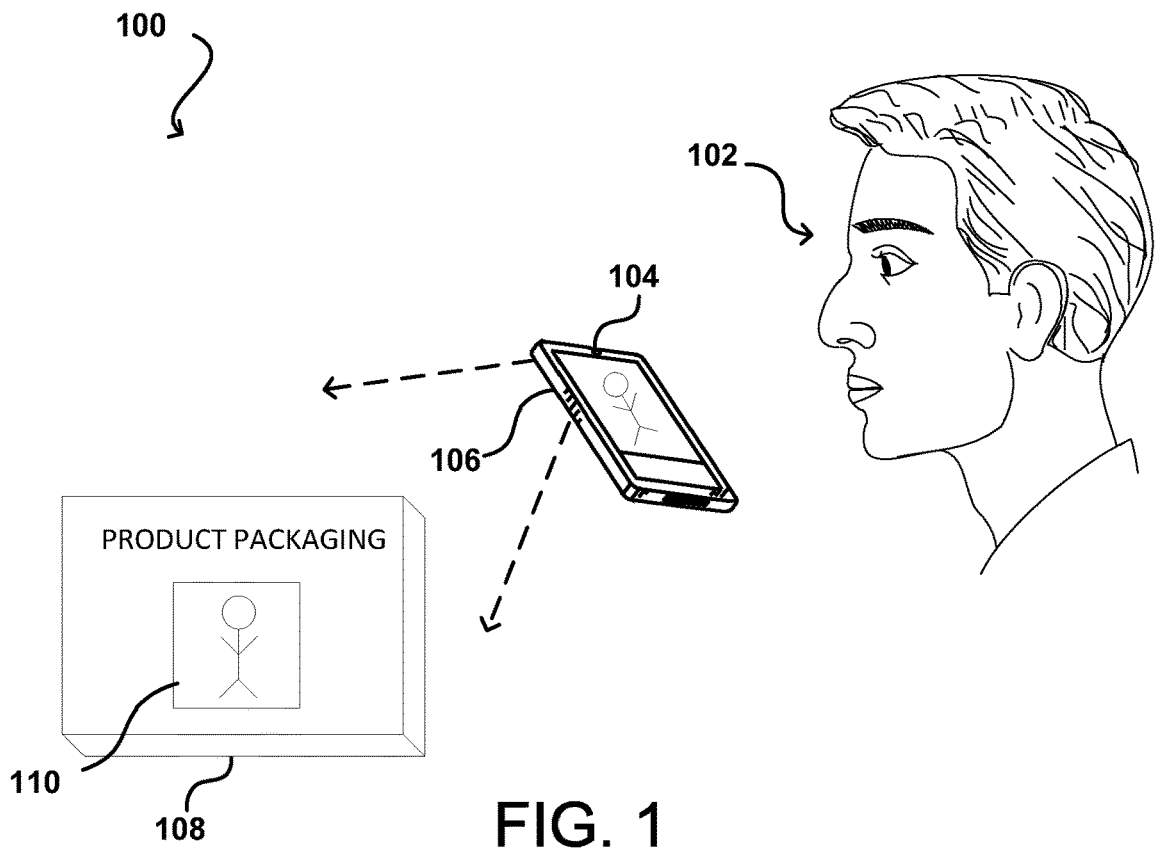
FIG. 1 illustrates an example environment in which aspects of the various embodiments can be implemented.

FIG. 1 illustrates an example search environment 100 that can be presented in accordance with various embodiments. User 102 can use computing device 104 to search for items through a search service. Using an appropriate application executing on computing device 104, the user is able to choose a type of search to perform (e.g., an image search) to obtain a list of matching items. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others.

As shown in FIG. 1, user 102 can use an image capture device built in to computing device 104 to take a picture 106 of an object 108. For example, user 102 may not know the terms to use to identify the object, a brand associated with the object, and/or user 102 may not know the name of the object or the object may be difficult to describe. For instance, user 102 may desire to know other products that are available associated with a particular brand, sub-brand, and/or type of product without knowing how to describe the object to search. In some embodiments, a user 102 may capture a picture of a portion 10 of the object 108. For example, a portion 110 may include a picture of a brand, trademark, or logo associated with an object 108 and/or the packaging associated with an object 108.

Figure 2:
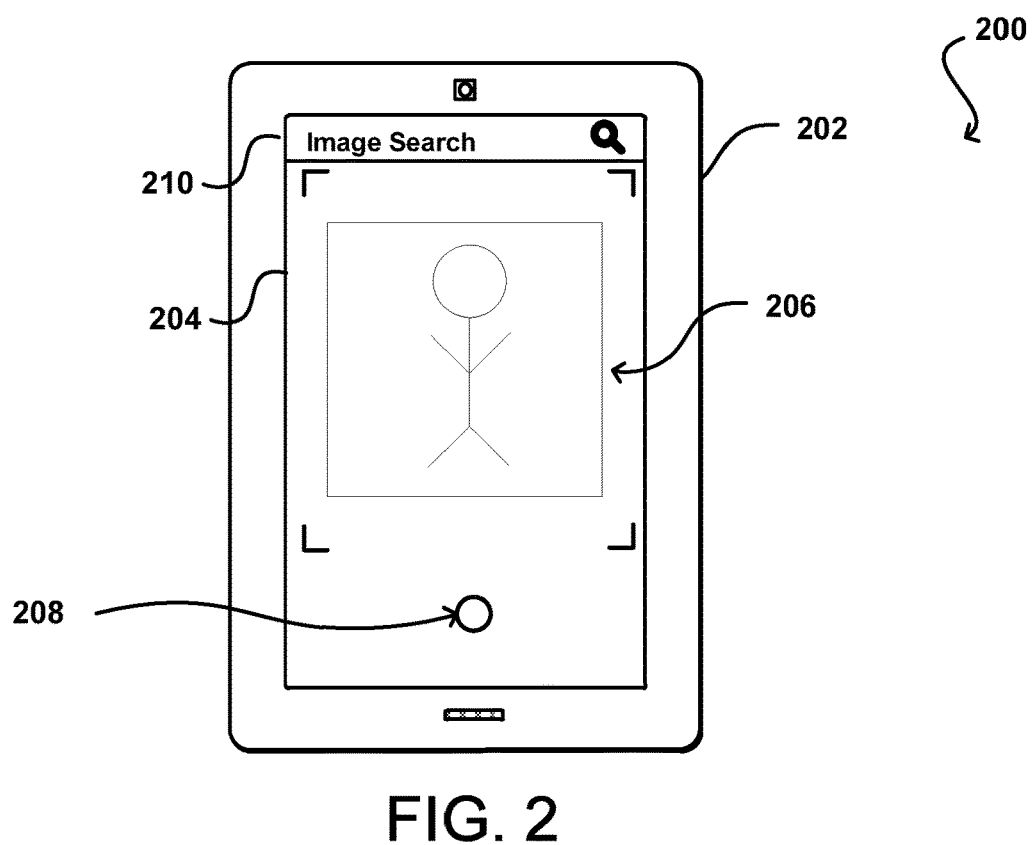
FIG. 2 illustrates an example search interface display that can be presented in accordance with various embodiments.

FIG. 2 illustrates an example search interface display 200 that can be presented in accordance with various embodiments. As shown in FIG. 2, search interface display 200 on computing device 202 can include an indicator associated with an image search (e.g., image search indicator 210) in which the user may begin a search by capturing an image associated with an object 108 in which they desire to find related products or content. When the user 102 selects an image search option in a search application on the computing device 202, the user 102 can be instructed to take a picture of an object 108 using an image capture device built into computing device 202. In some embodiments, the user 108 can upload an image previously captured or downloaded from a source other than the image capture device. As discussed further below, the image 206 can be analyzed to determine one or more features that may be used to match products and obtain search results associated with the captured image 206.

For example, the user may select an option to submit a picture for a product search into an application operating on the computing device. As shown in FIG. 2, in response to the user selecting an option to submit an image search query, an image capture device built into computing device 202 can be activated and a live view of the image capture device can be shown at 204. In some embodiments, computing device 202 can automatically identify objects 206 in the field of view of the image capture device. Once the intended object is shown at 204, the user can select a capture icon 208 to capture an image of the object. In some embodiments, a hardware button (not shown) may be used to initiate capture of the image of the objects.

Once the image of the object has been captured, features of the objects can be extracted. For example, an image matching service may include an object recognition component that is configured to determine an outline of each object shown in the image and match that outline to one or more models that correspond to known objects. Similarly, logos, text, or other identifiers on the object can be detected using a natural language processing component that may identify entities associated with the object or objects. Additionally, or alternatively, image processing techniques may be used to identify color(s), pattern(s), texture(s), etc. associated with the objects. Each of these features may be used to identify matching images with one or more content data stores.

Figure 3:
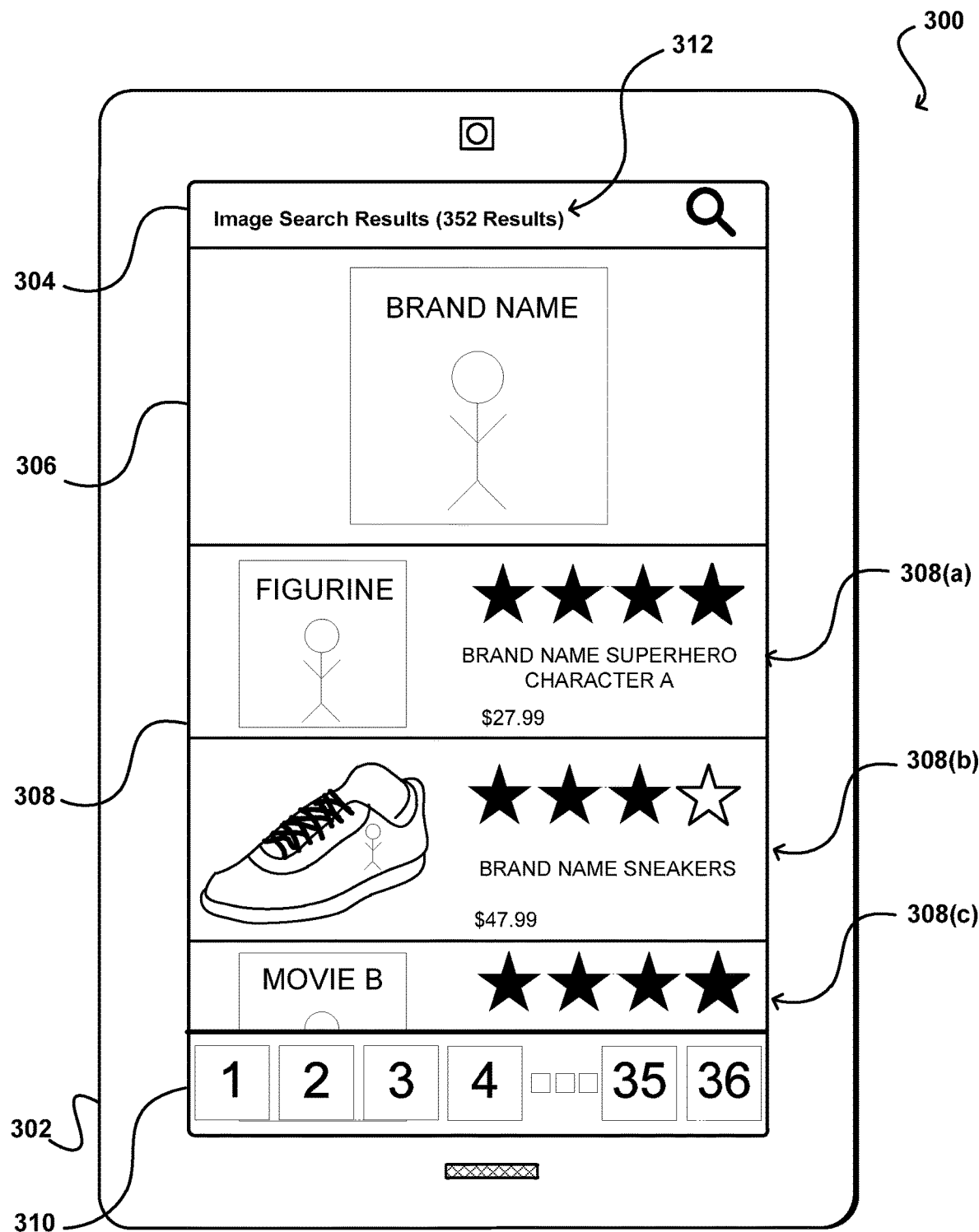
FIG. 3 illustrates an example search interface display that can be presented in accordance with various embodiments.

FIG. 3 illustrates an example search result interface display 300 that can be presented in accordance with various embodiments. As shown in FIG. 3, the captured image can be shown at 306, and the results of the image search (as identified at 304), can be shown at 308. For example, a results list 308 has been refined to include a variety of products 308(*a*)-308(*c*) that include the same image or a portion of the same image as the captured image 306. In some embodiments, results list 308 can be sorted based on how many features are in common with the object in the captured image 306. However, as shown by the objects 308(*a*)-308(*c*) shown in result list 308, the result list may include a variety of products that all share a portion of the image 306 or features associated with the image 306. Accordingly, a wide variety of products may be identified as matching at least a portion of the captured image 306. For instance, as shown by the search results identifier 312, the image query may match or be associated with a large number of products that may cover a large number of different types of products, brands, sub-brands, cross-brands, etc. Browsing through the large number of results may be burdensome and confusing to a user since the search results cover so many different products, brands, etc. For instance, in the search shown in FIG. 3, 352 search results are included in the results list 308 across multiple different pages 310 of search results. While the variety of products may include a portion of the captured image or may be associated with the captured image, the user may not be interested in each of the products. Thus, the user may have to select multiple different pages 310 of products in order to browse through the large number of products to find the appropriate product in which they are searching. This can be time-consuming, annoying, and burden-some on the user.

Figure 4:
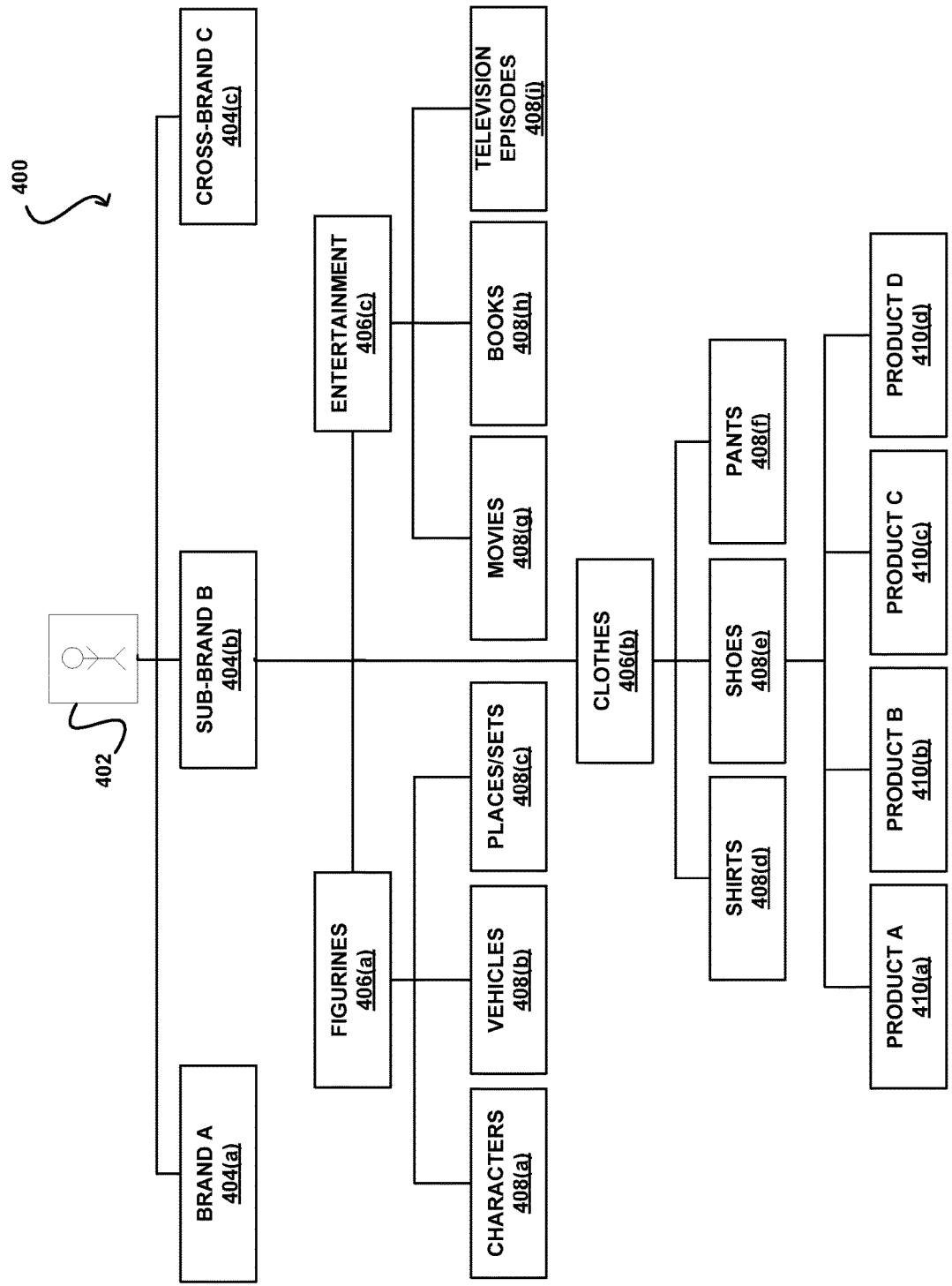
FIG. 4 illustrates an image matching hierarchical product map showing types of products that may match at least a portion of a captured image.

FIG. 4 illustrates an image matching hierarchical data map showing brands 404, categories 406, sub-categories 408, and products 410 that may match at least a portion of a captured image 402. As mentioned above, some objects may have a large number of products associated a portion of (or the entirety) of the object(s) captured in an image. For example, as shown in FIG. 4, a captured image 402 of a character from a movie or television show may be associated with different brands 404(*a*)-404(*c*) (e.g., brand A, sub-brand B, cross-brand C, etc.) that may each use a similar image and/or portion of the image (e.g., a character, logo, theme, title, etc.) that may be included on many different types of products. For instance, a character from a movie, television show, comic, etc., may be included on branded products as well as be included on products for sub-brands, cross-brands, etc. Accordingly, an image of the character may result in many different types of products that are associated with many different types or brands, sub-brands, etc. that a user may not be interested in.

Further, each of the brands 404(*a*)-404(*c*) may include a variety of different products 410(*a*)-410(*d*) across multiple different types of product categories 406(*a*)-406(*c*) and sub-categories 408(*a*)-408(*e*). For instance, sub-brand 404(*b*) which includes at least a portion of the captured image in at least some of the products 410 associated therewith may cover products in the product categories 406 of figurines 406(*a*), clothes 406(*b*), and entertainment 406(*c*). Further, the products 410 may include multiple different sub-categories 408 for each category 406. For instance, for the category of figurines 406(*a*), matching products may include product sub-categories of characters 408(*a*), vehicles 408(*b*), and places/sets 408(*c*). Although not shown, each of the sub-categories 408 may have additional sub-categories and numerous products 410 that include at least a portion of the captured image 402. For example, the category of clothes 406(*b*) includes products 410 having sub-categories of shirts 408(*d*), shoes 408(*e*), and pants 408(*f*) (as well as others). Each of the sub-categories can have one or more products 410. For instance, there are at least four different shoes that match at least a portion of the character from the captured image 402 as shown by "Product A" 410A, "Product B" 410B, "Product C" 410C, and "Product D" 410D.

Note that although the present application discusses an example of an image query search for a character in a show or movie, similar results may occur across image queries of many different types of products. For instance, patterns from a couch may be matched to many different types of products from shirts to cars to paintings. Similarly, an image of a logo or trademark may be applied to many different types of products in different product categories. Accordingly, the example of a character in a movie is meant only as an example and is not limiting to the various types of misidentification of products that can occur when using image queries for product searching. Further, the wide variety of matches that may be found in response to a search is further exacerbated by a poor quality image being taken by the user and/or by the inclusion of product packaging that is similar across multiple different types of products.

Figure 5A:
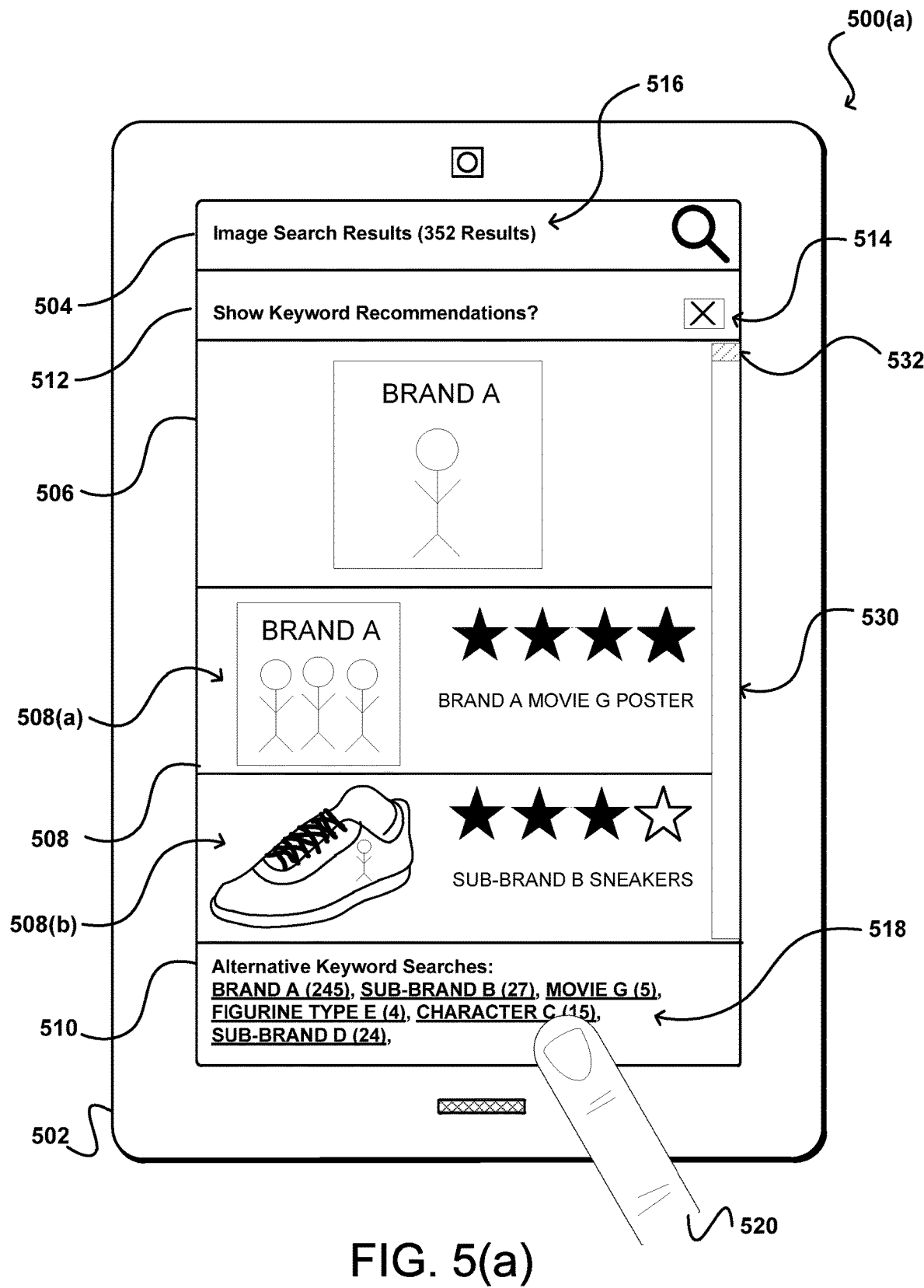
FIG. 5(a) illustrates an example result interface display in response to an image query that can be presented in accordance with various embodiments.
Figure 5B:
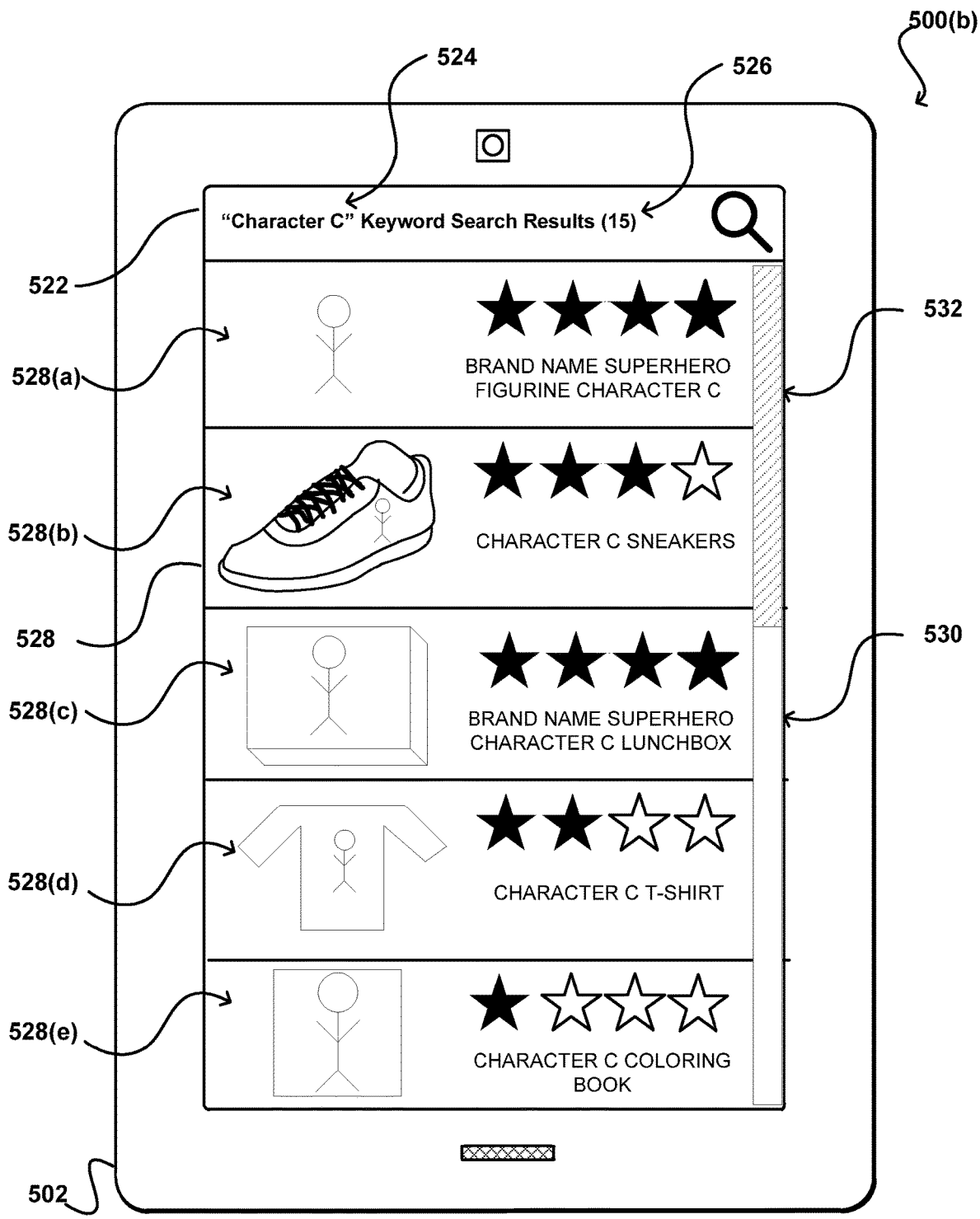
FIG. 5(b) illustrates an example result interface display in response to a selection of a recommended keyword by a user in accordance with various embodiments.

FIGS. 5(a) and 5(b) illustrate example search result interface displays 500(a)-500(b) that can be presented in accordance with various embodiments. As shown in FIG. 5(a), the search result interface display 500(a) shows a first display that shows the results 508 of an image query of a captured image 506 including keyword recommendations pane at 510. A variety of keyword recommendations 518 may be displayed within the keyword recommendation pane 510. The keyword recommendations 518 can be associated with the captured image 506 and may be returned in response to an image query of the captured image 506. Each of the keyword recommendations may include one or more keywords in a search string that is configured to initiate a keyword search using the one or more keywords when selected by a user.

The keywords 518 may be extracted from product content items associated with each matched image that is stored in one or more product data stores of the search service. The keywords 518 are associated with products that are matched as being similar to the captured image in response to the image query. For example, the captured image 506 may include a picture of a character and a brand name ("Brand A") that may be displayed on a package. When the image matching is performed, many different products may be matched based on portions of the brand name, brand image, and/or the character being associated with those products. For instance, the first product 508(a) displayed may include a movie poster associated with the brand and the character being displayed on the movie poster. Further, the second displayed product 508(b) may include shoes that have a graphic of the character but are associated with a different brand than the original picture ("Brand B"). Various other products that are not displayed in the current view may also be matched to the image as well and included in the results list. For instance, 352 total matching image results were found as matching at least a portion of the captured image as shown at 504 by the indicator of the number of matching image search results 516. The products from the result list that are not presently displayed may be shown as the user scrolls the product result display pane 508 down to reveal the additional matched products. A present position relative to the total number of products within the result list may be indicated by a present position portion 532 of the scroll bar 530 to the right of the display. As the user browses through the product result list by scrolling downward or upward through the products, the highlighted present position portion 532 of the scroll bar may indicate to the user how far they are through the total result list. In some embodiments, different page numbers (as shown in FIG. 3) may also be used to indicate the present position within the total result list of matching products. As can be seen from the present display, it may be burdensome and time-consuming for the user to scroll through the large list of matching product results to find the product that the user is interested in.

In some embodiments, the number of content items that match a keyword may be displayed along with the keyword search strings that are presented to the user. For example, as can be seen in the keyword recommendation pane 510, each of the keyword search strings presented to the user has a corresponding number of matching content items that are associated with the one or more keywords within the recommended keyword search string 518. For instance, the recommended keyword search string "Brand A" has 245 matching content items associated with the keywords "Brand A," while the recommended keyword search string "Character C" has 15 products associated with it. This provides the user more information about each of the recommended keywords and allows the user to quickly and easily identify whether the potential search results associated with a recommended keyword search string will likely hold the relevant items they are searching for.

Accordingly, embodiments display keyword search strings within a recommended keyword search pane 510 to allow the user to quickly identify and select a keyword search string to initiate a keyword search of the products to further narrow and/or tailor the search to the user's interests. For example, if the user is interested in finding products that are associated with the brand displayed in the captured image instead of the particular character in the captured image, the user may select the recommended keyword search string associated with the brand (e.g., "Brand A"). However, if the user is looking for products associated with the character (e.g., "Character C") from the picture in particular, the user may select the keyword search string labeled "Character C". The user may review all of the recommended keyword search strings and select the most relevant search string for their interests without having to browse through the large number of products that were matched to the captured image 506. Accordingly, the user is saved the time and effort of reviewing all of the products to find products related to their interest and can refine their search to a particular interested subject matter and/or keyword without having to browse through all of the matching products or input any additional search information. Instead, the various keywords associated with the matched products from the result list may be distilled into keyword search strings and presented for the user's selection. The user may select the search string by touching the display using their finger 520 (or stylus), by saying the name of the keyword search string into a microphone, and/or through any other suitable input that indicates the user's intention to select a particular recommended keyword search string 518. In some embodiments, the keyword search strings can be pre-populated in the existing search box (not shown) to allow a user to select an appropriate search string from a text search box (not shown).

The keywords may be assigned to each product through any suitable method. For example, keywords may be assigned based on common information associated with each product in a data store. For instance, a brand-name, title, name, and/or any other information associated with the description of each product may be saved as a keyword for the product. Alternatively and/or additionally, keywords may be assigned based on information gathered and tracked by the search service, for example, a most commonly searched keyword for users who purchase the product, terms from commonly asked questions and/or from reviews associated with the product may be stored as keywords, and/or a manufacturer or service provider associated with a product may assign keywords as part of listing the content with the search service system.

Further, in some embodiments, recommended keywords may be identified by analyzing the content of the image. For example, text recognition may be applied to the image and any text included in the image may be added as potential keyword search strings. Furthermore, in some embodiments, a product category may be determined for the product in the image and that category may be provided as a potential keyword. As such, data interpreted and/or determined from the image data itself may be used to provide recommended keywords to the user. For instance, a logo in the image data may be recognized as being associated with a particular brand or name which may be added as a potential keyword search string. Further, in some embodiments, a brand name may be captured in the image data and the brand name may be presented as a recommended keyword through the use of text recognition of the image data. In some embodiments, these keyword search strings may be presented without being matched to particular content items through the image matching described in other embodiments. These keyword search strings may be presented in addition to and/or instead of the image matching keywords identified in other embodiments.

In some embodiments, key-phrases may be used instead of, or in combination with, the keywords. For example, there may be multiple words in a brand name, title, character name, etc. Accordingly, when using keyword herein, key-phrases may also be used to identify multiple words within a particular type of keyword or to combine multiple keywords into a more particular keyword search for better tailoring of the product search. For example, a keyword search string may include a combination of multiple keywords including a brand name, sub-brand name, and a character name associated with a figurine to identify a particular character from a particular scene, movie, book, and/or other circumstance of that character.

In some embodiments, the keyword recommendations pane 510 and corresponding keyword recommendation functionality may be activated or de-activated by a user using a selectable keyword recommendations prompt 514. In some embodiments, the keyword functionality may be activated or de-activated by the search service based on a number of results, a variety of different identified products, and/or through any other suitable method. For example, the search service may identify a number of products matched in response to an image query and may determine that because of the large number of matches, keyword recommendations should be provided to the user to help them better identify items of interest. As such, the keyword recommendation service may be activated where a number of matched images to an image query is larger than a predetermined threshold of matching images.

In some embodiments, the types of matches in response to the image query may be analyzed to determine whether to present keywords in response to the image query. For example, the service may determine whether the matches are associated with different categories or types of products. If so, the keyword functionality may be activated and keywords may be presented to the user. However, if all of the matching content is associated with a single type of content and/or category of content, the keyword functionality may not be activated and keyword recommendations may not be provided.

In some embodiments, the keyword recommendations may be provided based on the results of the keyword generation service. For example, the keyword recommendation service may be initiated for each search but recommended keywords may only be presented to the user based on the specificity of the generated keyword search strings. In some embodiments, a specificity value may be determined for each of the keywords based on the number of products that match the keyword. For instance, the keyword generation service may perform a keyword search for any and all identified keywords and evaluate the number of products that are matched to each keyword or key-phrase. If the number of results matching the keyword search string is over a threshold number of matching content items, the generated keyword search string may not be provided because it is not specific enough to provide value to the user. For example, if a recommended keyword search string for an image is "shoe" which is associated with thousands of matches in the search system, the recommended keyword may be removed before being presented to a user. Accordingly, such keywords may be removed from the matched keywords for the image before search strings are generated and returned to a user. Thus, the specificity of the identified keywords for an image query may impact the number of keywords that are presented to a user in response to an image query. For example, if multiple different specific keywords are associated with an image query and each of the specific keyword search strings result in a number of different tailored keyword searches, all of the keywords may be selected and used in keyword search strings presented to the user. However, if multiple generic keywords are identified that result in large numbers of product matches that are over the specified threshold value, then those keywords may be removed from the identified keywords and a smaller number of keywords may be provided to the user for selection.

FIG. 5(b) illustrates an example search result interface display 500(b) in response to a selection of a recommended keyword search string by a user in accordance with various embodiments. Upon selection of one of the keyword search strings, a keyword search may be initiated by transmitting a keyword search query to the search service. The search service may then perform a keyword search through the product data store to match any products associated with the selected keyword search string 524. The search service may return a results list of matching products to the selected keywords that may be displayed at 528. The results list for the matching products may be larger or smaller than the results list in response to the image query based on the selected keyword search string, but the matching products will all be associated with or contain the one or more keywords contained within the search query.

FIG. 5(b) shows a keyword search 524 and a number of results for the keyword search query 526 based on the selected keyword search string selected by the user in FIG. 5(a). For instance, the user selected the search recommendation of "Character C." As shown in the products results list 508, all of the returned products are now associated with "Character C" including a figurine 528(a), sneakers 528(b), lunchbox 528(c), t-shirt 528(d), and a coloring book 528(e). As can be seen by the number of total search results 526 and the present position portion 532 of the scroll bar 530 on the right of the display, there are fewer products to browse and a user may quickly and easily identify alternative products, product options, and/or find an actual product they are interested in that is related to the originally submitted image query. Accordingly, the user has tailored their search to the specific items and/or area of interest based on the recommended keywords provided in response to the image query. As such, the user was able to identify relevant keywords associated with an image, initiate a keyword search, and find products of interest without having to browse through large products lists, formulate keyword search language on their own, and without requiring the user to describe a product or aspects of a product that may be difficult for the user to formulate.

Figure 6:
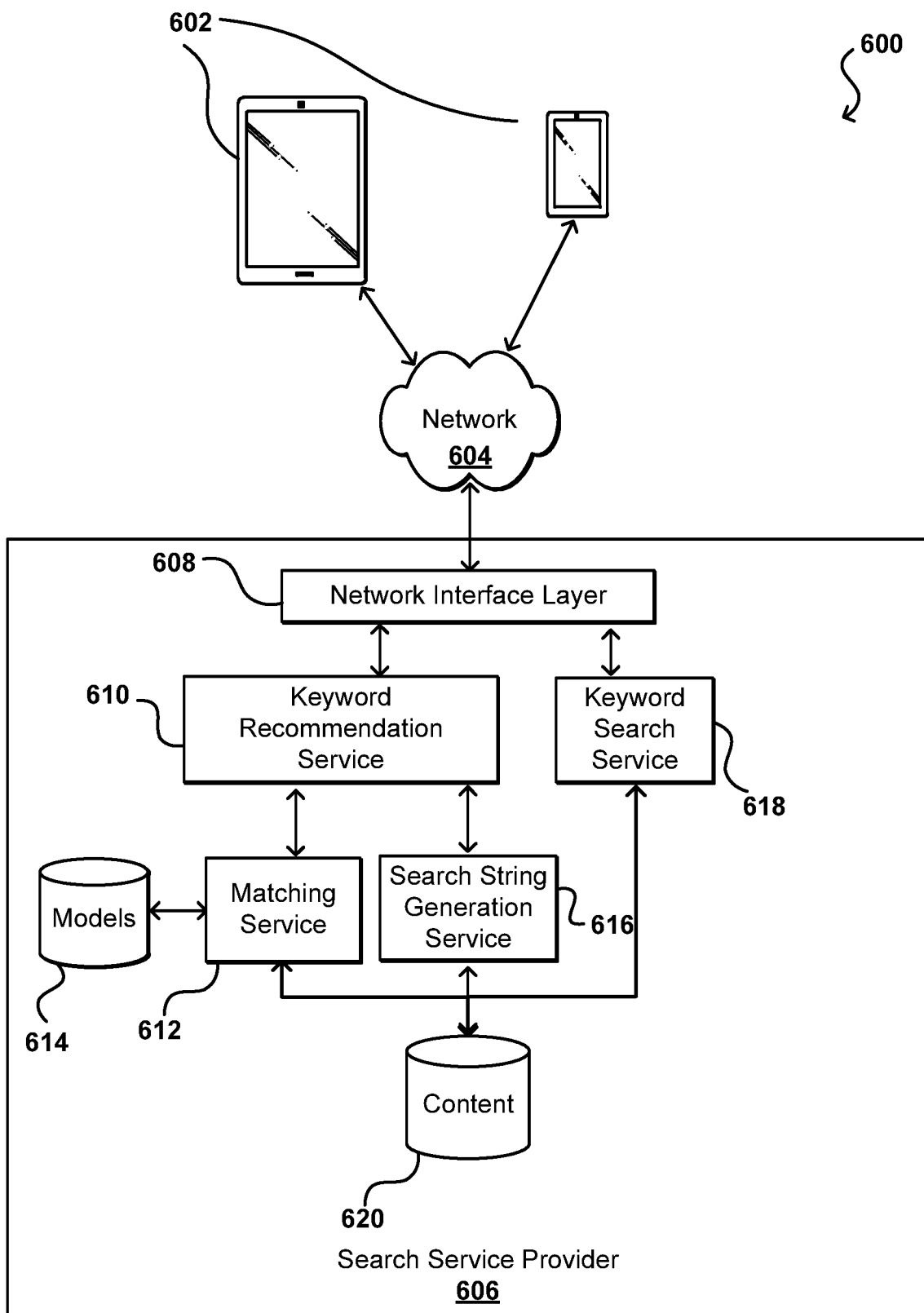
FIG. 6 illustrates an example system for generating and delivering recommended keywords that can be utilized in accordance with various embodiments.

FIG. 6 illustrates an example system for an image matching and keyword generation in accordance with various embodiments. In this example, a user of a computing device 602 is able to provide information relating to an item of interest. Although portable computing devices 602 are shown in this example, other computing devices such as laptop computers, desktop computers, wearable computers, and other computing devices may also be used. As discussed, an image search may be initiated by capturing an image of an object of interest and transmitting an image query to a search service provider 606.

The image query can be transmitted from the computing device 602 across at least one appropriate network 604 to a search service provider 606. Search service provider 606 can provide search services associated with a website, a database or other data store, one or more local or remotely connected computing systems, or other searchable system. The network 604 can be any appropriate network, such as may include the Internet, a local area network (LAN), a cellular network, and the like. The request can be sent to an appropriate search service provider 606, as may provide one or more services, systems, or applications for processing such requests. The information can be sent by streaming, uploading, or otherwise transferring the information using at least one appropriate communication channel.

In this example, the request is received to a network interface layer 608 of the search service provider 606. The network interface layer 608 can include any appropriate components known or used to receive requests from across a network, such as may include one or more application programming interfaces (APIs) or other such interfaces for receiving such requests. The network interface layer 608 might be owned and operated by the provider, or leveraged by the provider as part of a shared resource or "cloud" offering. The network interface layer 608 can receive and analyze the request, and cause at least a portion of the information in the request to be directed to an appropriate system or service, such as a keyword recommendation service 610. A keyword recommendation service 610 in this example includes components operable to receive an image query, analyze the image query, and return recommended keyword search strings in response to the image query.

The search service provider 606 utilizes a keyword recommendation service 610 to generate and provide keywords search strings to a user. The keyword recommendation service 610 provides the image query to a matching service 612 that searches a content data store 620 for images matching a portion or the entirety of the image, identifies content items associated with the matched images, and provides content identifiers associated with the matched content items to the keyword recommendation service 610 for generation of keyword search strings.

The content data store 620 may include any content associated with a variety of products cataloged through the search service. For example, the content data may include a plurality of content items where each of the content items is associated with a different product provided through the search service. Each of the content items may include a content identifier, a description of a product, one or more images associated with the product, one or more keywords associated with the product, reviews associated with the product, and/or any other information about a product that is stored by the search service provider.

The matching service 612 may include an object recognition component (not shown) that is configured to identify objects in image data received from the user. For example, an object recognition component can identify an outline of each object shown in an image and match that outline to one or more models 614 that correspond to known objects. Similarly, features of objects (corners, edges, etc.) can be identified and compared to model data 614 to identify known objects. For example, model data 614 may include a plurality of geometric models, each corresponding to a different stored object or type of object. Further, model data may include models of logos, trademarks, characters, and/or any other relevant product information that is stored in the model data 614 to identify a known logo, mark, and/or other identifiable product information. Once a known object is identified in the image data, portions of the image data that do not include the object can be ignored or discarded. Additionally, or alternatively, the matching service 612 may use an image processing component (not shown) that is configured to identify color(s), pattern(s), texture(s), etc. associated with the objects. Accordingly, the matching service 612 may, through any suitable manner, use the features of the object of interest to identify features and/or shapes of the underlying object of interest and match those features and/or shapes to stored images in a content data store 620. Once the matching images are identified, the matching service 612 may determine content identifiers associated with each of the matching content items in the content data 620 and return the content identifiers to the search recommendation service 610.

In some embodiments, not all of the content items associated with matching images will be returned to the keyword recommendation service 610. For example, the matching service 612 may calculate a similarity score for each of the matched images. The similarity score may be calculated for each of the images according to the percentage and/or amount of similarity between the image associated with the content item and image data in the image query. The amount of similarity may be calculated based on a comparison of image histograms, pixels, shapes, patterns, colors, and/or through any other suitable method. A predetermined image similarity threshold may be applied to the matched images and images with similarity scores that do not meet the predetermined similarity score threshold may be removed from the identified content items as being associated with the image query. For example, five matched images may have different amounts of similarity to an image from an image query. For instance, 5 different images that match some portion of the image in the image query may have different amounts of overlap or similarity between the different images. Accordingly, a similarity score of 10, 25, 83, 45, and 90 may be provided to the set of matched images. However, so that only those images that have a large amount of similarity with image being search for will be returned and used in the keyword generation steps, each of the similarity scores for the various images may be compared to a predetermined similarity score threshold of 40. Any images with similarity scores under the threshold similarity score would be removed from the set of matched images. Accordingly, only those content items associated with images having a similarity score over 40 would be identified as matching the image query. Thus, the matching service 612 may remove any content item identifiers from the set of matching images returned to the keyword recommendation service 610 for determination of the content items associated with the matched images.

Note that in some embodiments, the matching service can use other types of multimedia inputs to identify matching images and corresponding content items. For example, the matching service could receive an audio recording, video content, and/or any other types of content and may extract images and/or terms associated with the received content to match images to the received content.

The keyword recommendation service 610 may provide the content identifiers associated with the matching content items to the search string generation service 616. The search string generation service 616 identifies keywords associated with each of the content identifiers of the content data 620. The search string generation service 616 generates keyword search strings based on the returned keywords from the identified content associated with the various content items stored in the product data store 622. For example, the search string generation service 616 may identify a plurality of keywords associated with the received content identifiers by extracting at least one keyword from each of the identified plurality of content items. For instance, each content item in the content data 620 may include one or more keywords. The search string generation service 616 may extract the one or more keywords associated with the content item and store each of the keywords in a temporary memory.

The search string generation service 616 may generate a keyword search string using the extracted plurality of keywords. The search string generation service 616 may process the plurality of keywords associated with the content items in order to generate the best possible keyword recommendations. For example, the search string generation service 616 may remove duplicate keywords within the plurality of keywords. For example, if a particular brand name is returned as the keyword for 5 different products that match the image query, the search string generation service 616 may remove 4 of the keywords from the results instead of generating 5 separate keyword search strings including the same recommended keywords. As such, in some embodiments, the search string generation service may identify a subset of the plurality of keywords by determining a set of unique keywords within the plurality of keywords such that each of the keywords within the subset of keywords is unique or not duplicated within the larger set of keywords extracted from the variety of matching content items.

The search string generation service 616 may generate any number of different keyword search strings. The number of recommended keywords may be predetermined (e.g., the top 5 keywords are returned for an image query) or the number of recommended keyword search strings generated may be determined based on the number of unique keywords and/or matching products identified in the search. In other embodiments, any number of generated keyword search strings may be returned based on a quality analysis of the keywords. Thus, any number of keyword search strings may be displayed to a user.

In some embodiments, the search string generation service 616 may use the occurrence rate of the keywords to identify important keywords and may return the generated keyword search strings in order of priority based on the occurrence rate of the keywords within the extracted plurality of keywords. For example, the search string generation service 616 may generate a search string by identifying an occurrence rate of each keyword within the plurality of keywords and selecting one or more of the keywords with the highest occurrence rate within the plurality of keywords as a first search string. For example, if there are 15 matching products associated with an image and 12 of them use a brand name, the first search string generated may include the brand name. If the brand name is the most prevalent keyword in the returned list of keywords, the brand name may be given first priority and be displayed at the top of a list of keywords to the user. Similarly, if a keyword is only included on one of the content items, it may be discarded and/or given a lower priority such that it is the last keyword search string displayed to the user. Accordingly, the search string generation service 616 may identify a priority of the search strings based on the occurrence of the keywords within the search strings and display the search strings in order of highest to lowest priority.

In some embodiments, as described above, the search string generation service 616 may use the specificity of each of the keywords to generate the keyword search strings. For example, the search string generation service 616 may remove duplicate keywords from the plurality of keywords, may identify a number of matching content items in the content data 620 associated with each of the remaining keywords by searching the content data for matching content items associated with each of the keywords, and may select the keywords to include in generated search strings by identifying the keywords with the lowest number of content items associated therewith. For example, if one keyword search string matches to 15 products and another matches to 100 products, the more specific keyword search string that matches to fewer products may be displayed before and/or at the top of a keyword recommendation list before the less specific keyword search string. Further, generic keywords matching more than a threshold number of products may be removed.

In some embodiments, instead of generate a subset of keywords by removing duplicate keywords, the search string generation module may generate a histogram of the occurrence rate of the keywords within an identified plurality of keywords and select one or more keywords based on the histogram results of the keywords. For example, in some instances, keywords with the largest number of instances may be selected. However, the keywords should be discriminative such that a selected keyword provides different and more relevant search results than the previously identified search results. For example, if a keyword is present within every matching content item, selection of the keyword will not improve the matching content items over the previous image matches. In other words, the search will not further discriminate the results over the image search matches that were previously provided in response to the image search. Accordingly, keywords may be removed from consideration and/or not selected if they are included in every matching content item associated with the matching images.

Relevant keywords may be identified through a variety of different methods. For example, in some embodiments, a relevance score may be assigned to each keyword identified with the matching images and the recommended keywords may be presented to the user based on the relevance score for each keyword. The relevance score may be calculated using any of the data presented above and may be based on the number of sales, matches, searches, etc., associated with the keywords. The relevance score may be based on the discriminative value of each keyword based on a plurality of content items stored in one or more data stores of content items. For example, relevance may be based on the ability for each keyword to distinguish and return different matching content that will be relevant to the user. For example, relevance may be identified by analyzing the number and types of search results associated with each keyword. In some embodiments, click through data associated with content items, sales results associated with content items, user-specific search and purchase history, and any other relevant information may be used to identify the most relevant keywords to select and use for a generated search string. For example, each distinct keyword within the plurality of keywords could be associated with a number of sales, a category (also referred to as a geo-code) associated with the matching content items, click-through data (e.g., number of searches using that term, number of resulting sales, etc.), and/or any other relevant information may be stored in the keyword data store for selecting the most relevant keywords for generation of keyword search strings.

In some embodiments, the search string generation service 616 may generate recommended keyword search strings using known keyword phrases associated with the matched products. For example, the search string generation service 616 may compare the keywords from the plurality of keywords to a plurality of stored keyword phrases, may identify a match between two or more of the plurality of keywords and one of the stored keyword phrases, and may select the at least one stored keyword phrase as the search string. For example, if keywords of "Brand A" and "Super-Hero C" are returned from the content data 620 based on the matched images, the search string generation service 616 may compare the keywords "Brand A" and "SuperHero C" to a list of known keyword phrases to identify if a keyword query exists that matches these separate keywords. Accordingly, keyword phrases may be generated using keywords that are not specifically returned in phrases. Thus, if "Brand A SuperHero C" or "SuperHero C Brand A" are found in the known keyword phrases, the search string generation service 616 may generate this keyword phrase as a search string and return it along with the separate keywords. As such, the search string generation service 616 may identify commonly used phrases using the returned keywords to provide tailored search options to a user.

In some embodiments, the keyword recommendation service 610 may generate a log (not shown) of associated keywords generated in response to the content identifiers provided by the keyword recommendation service 610 for future analysis and optimization based on user selection of recommended search strings. The keywords and the keyword search strings generated by keyword search string generation service 616 for a given image received from a user can also be stored in a log (not shown) as being associated with the image query received from the user. This enables keyword recommendation data to be gathered and organized from a large number of different image queries related to a large number of potential objects. In some embodiments, demographic data related to the user can be collected and stored in the log with the query image, content items, and the generated keywords. The demographic information can include user age, sex, geographic location, etc. This information can be used to identify regional keyword selection and/or keyword search tendencies. For example, users in some regions may tend to refer to a feature by one description while users in a different region use a different description. This may impact the keyword recommendations that are generated for a particular image query.

Once the keyword search strings are generated, the search strings may be returned to the keyword recommendation service 610. The keyword recommendation service 610 receives the generated keyword search strings from the search string generation service 616 and transmits the generated keyword search strings to the network interface layer 608 for delivery to the client device 602. The network interface layer 608 may identify the client device and transmit the generated keyword search strings to the client device through the network 604 in response to the image query.

The client computing device 602 may display the keyword search strings to the user. The user may select one of the keyword search strings and the client computing device 602 may generate a keyword query in response to the selection of the keyword search string. The keyword query may include the one or more keywords contained within the keyword search strings. The client computing device 602 may transmit the keyword query to the network interface layer 608 in response to the user selection. The network interface layer 608 may submit the keyword query to a keyword search service 618 of the search service provider 606.

The keyword search service may search the content data store 620 for content items that match the one or more keywords in the keyword search string. Content items matching the keyword query are then returned to the network interface layer 608 for delivery to the computing device. As should be understood, each service can include one or more computing components, such as at least one server, as well as other components known for providing services, as may include one or more APIs, data storage, and other appropriate hardware and software components.

Figure 7:
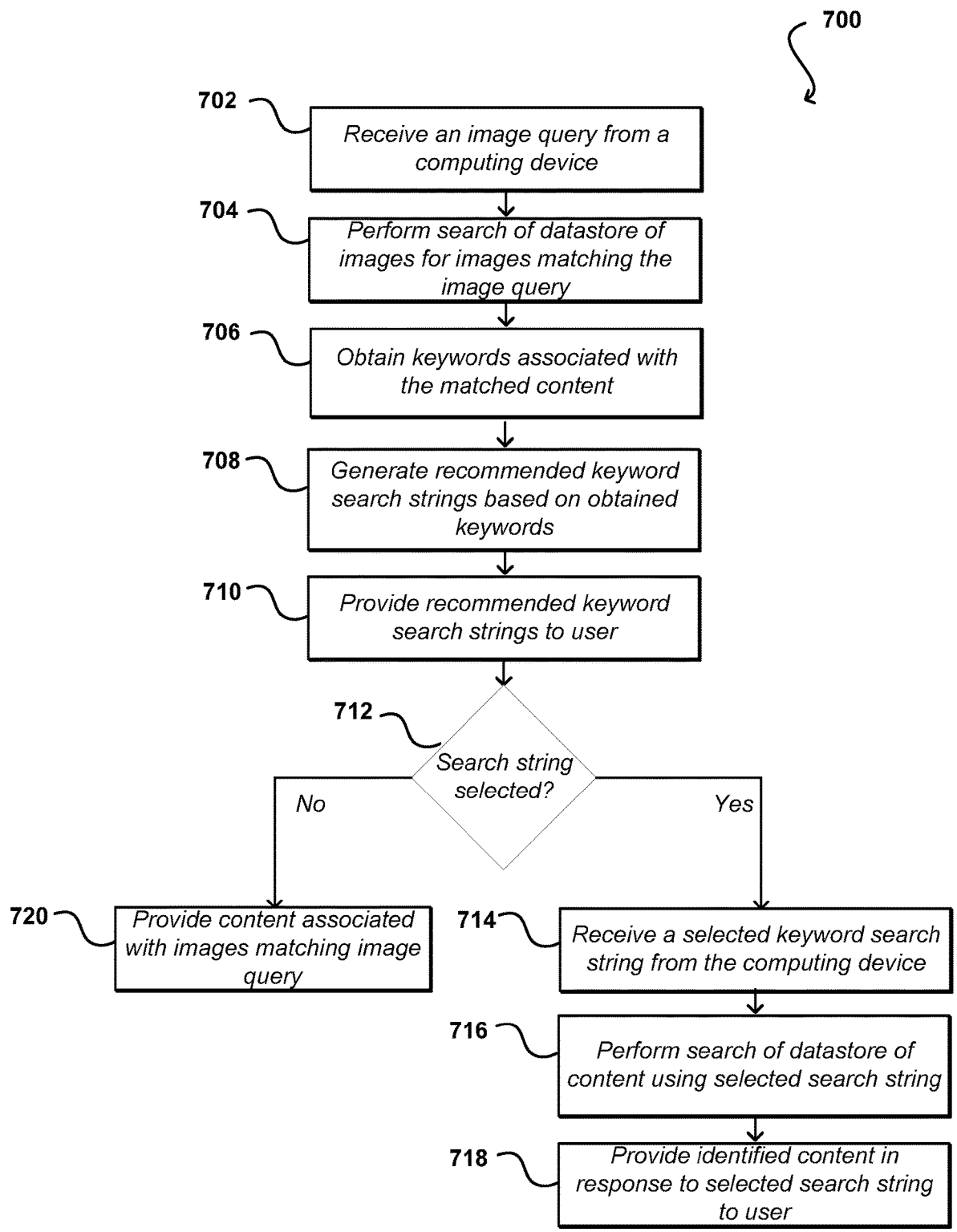
FIG. 7 illustrates an example process for providing recommended keywords in response to an image query that can be used in accordance with various embodiments.

FIG. 7 illustrates an example process 700 for generating recommended keywords in response to an image query that can be utilized in accordance with various embodiments. It should be understood that there can be additional, fewer, or alternative steps performed in similar or alternative orders, or in parallel, within the scope of the various embodiments unless otherwise stated. In this example, an image query can be received 702 from a client computing device. The image query may include image data captured by a camera on the client computing device or image data of an image stored or accessed by the computing device. The image data may include a representation of an object of interest.

A data store of images or other searchable system including stored images can be searched 704 using the received image query to identify images matching the image query. As described above, one or more features of an object of interest within the image data may be identified and compared to one or more stored features associated with a plurality of images in a content data store 620 to identify a plurality of images having features that match the one or more features of the object of interest from the image data. A plurality of content items may be identified as being associated with the identified images that match the image query. As discussed above, in some embodiments, a product data store may include images, content identifiers, descriptions, keywords, and any other relevant information associated with a product. The matching service 612 may use a content item identifier associated with a matched image to identify content items associated with the matched images.

In some embodiments, searching the image data store for matching images may include identifying one or more features of an object of interest from the image query, searching at least one image data store by comparing the one or more features of the object of interest to one or more stored features associated with a plurality of multimedia in the at least one image data store, and identifying a plurality of images having features that match the one or more features of the object of interest from the image data. Each of the plurality of images may be associated with one of a plurality of content items stored in a product data store. Accordingly, a content item identifier may be returned to the keyword recommendation service 610 for generation of keyword search strings as discussed herein.

A plurality of keywords associated with the matched content items may be obtained 706 by identifying at least one keyword for each of the matched content items. As discussed, the search string generation service 616 can be used to identify the content item referenced by a content item identifier and keywords and/or key-phrases stored within or being associated with the content item may be extracted to obtain at least one keyword for each content item matching the image query.

Once a plurality of keywords have been obtained, a recommended keyword search string may be generated 708 based on the obtained keywords. The generated keyword search string may include at least one keyword from the obtained keywords. The search string generation service 616 may process the extracted keywords to generate the search strings using a variety of processes and criteria as described above. For example, the search string generation service 616 may analyze the number of results, the number of corresponding content items associated with the keywords, the number of types of content in the results, the specificity of the keywords, etc., when selecting and generating the keyword search strings. For instance, a relevance score may be assigned to each of the keywords and the keywords with the highest relevance scores may be selected and used to generate the keyword search strings. As described above, the relevance scores may be calculated based on the discriminative value of each of the keywords in light of the matching content items for identifying those keywords that will separate the possible matching content items. For example, search results associated with each keyword may be analyzed based on sales data, click-through data, and other information to identify those keywords that are the most relevant to the user and/or the matching images.

Once at least one keyword search string is generated for the search query, the keyword recommendation service 610 may cause the recommended keyword search strings to be presented 710 to a user using the computing device. The recommended keyword search strings may be presented in any suitable manner to a user. For example, the recommended keywords may be displayed as alternative search links and/or within a search area for subsequent searching.

The user may review the recommended keyword search strings and may determine if any of the keyword search strings captures the object they are interested in. If a search string is selected 712, the selected keyword search string is received 714 by the search service. The keyword search string may be received as a keyword query and the keyword search service may perform a search of one or more data stores of content items using the selected keyword search string. Thus, the generated keyword search strings presented to the user are configured to initiate a keyword search of one or more data stores using the at least one keyword when selected by a user of the client computing device.

Additionally, in some embodiments, a keyword search query may be performed for each potential recommended keyword search string before returning the keyword search strings and/or search links to the user. For example, searches based on each recommended keyword may be performed and the results associated with each of the keyword search strings may be cached and delivered along with the recommended keywords at 710 before being displayed to the user. Once a user selects a keyword search string, the search results may be displayed to the user without requiring a return keyword search query to be sent to the server computer. Accordingly, in some embodiments, the search may be performed before returning the keywords and the results associated with each keyword search string may be cached before a user has selected one of the displayed search keywords. Further, as described above, the number of matching content items associated with each keyword search string may be displayed to the user along with the keyword search strings to assist the user in selecting one of the possible search strings. Accordingly, in some embodiments, a subset of content items to be displayed on the client computing device can be cached for the generated search string link when the search string was generated.

If the user does not select a presented keyword search string, content items that match the image query may be provided 720 to user by displaying the results on the client computing device. In some embodiments, the content items may be presented to the user whether or not the keyword search strings are selected or not. For example, in some embodiments, products returned in response to the image query may be displayed to the user along with the recommended search strings. In other embodiments, a prompt showing the recommended search strings may be displayed without any other products displayed and the user may select a keyword search string before any products are displayed. In some embodiments, the selected keyword search string may be used to search only the content items returned in response to the image query (without a separate keyword search of the content data store 620 for products that were not returned in response to the image query).

The content data 620 may be searched 716 using the keyword search string by comparing content within a plurality of content items of a content data store to the at least one keyword of the plurality of keywords. For example, for a keyword query of "Brand A," any content items having "Brand A" in the description and/or title may be identified as being associated with the keyword query. Any number of different types of information within a content item may be used to identify matching content items to the keyword.

Content associated with the identified content items may be provided 718 to the user computing device. The content may include images of a product, a product description, pricing information, reviews, purchasing information, and/or any other relevant information that may allow a user to determine whether the product matches their interest.

Figure 8:
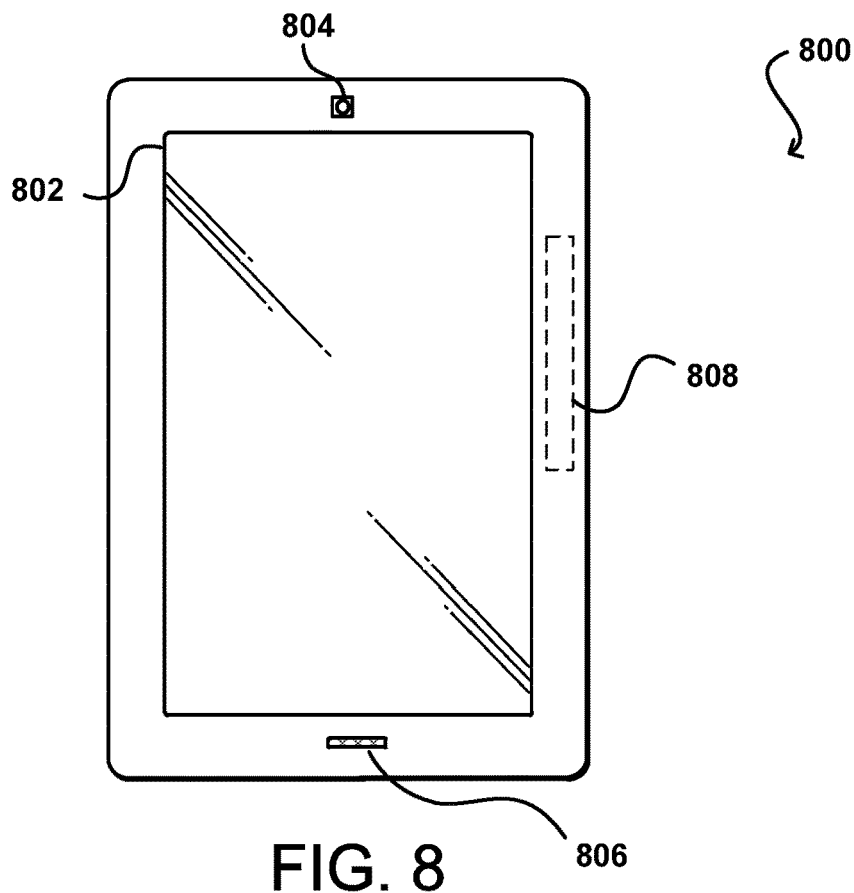
FIG. 8 illustrates an example device that can be used to implement aspects of the various embodiments.

FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 800 has a display screen 802 on the front side, which under normal operation will display information to a user facing the display screen (e.g., on the same side of the computing device as the display screen). The computing device in this example includes at least one camera 804 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video. The example computing device 800 also includes at least one microphone 806 or other audio capture device capable of capturing audio data, such as words or commands spoken by a user of the device. The example computing device 800 also includes at least one communication mechanism 808, such as may enable the device to utilize a wired and/or wireless connection to communicate over at least one network, such as a cellular network, the Internet, and the like.

Figure 9:
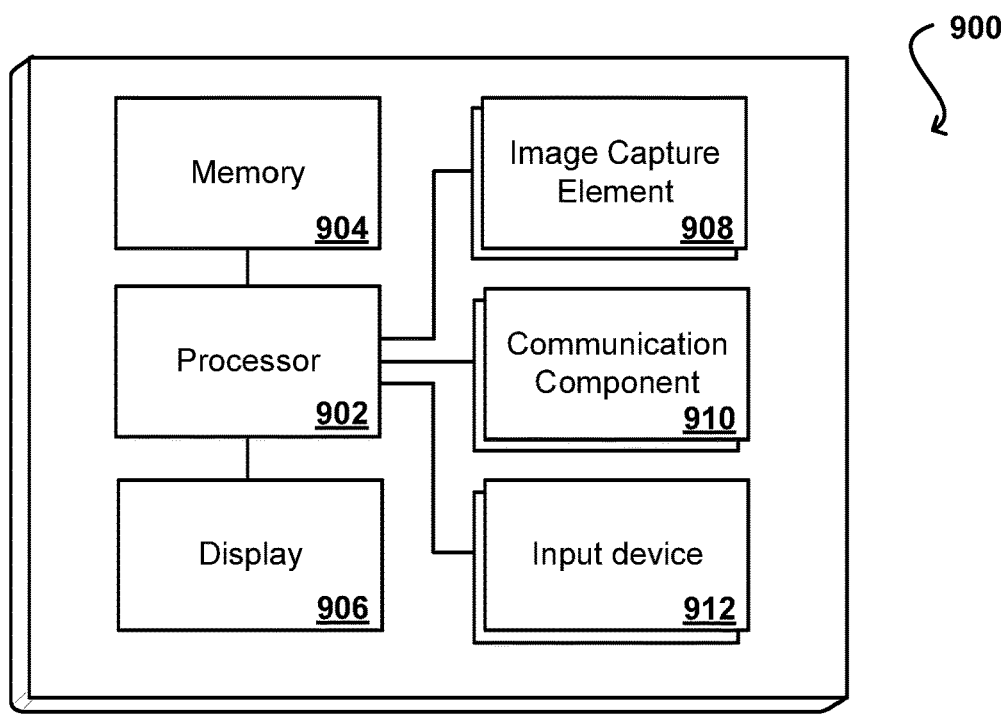
FIG. 9 illustrates example components of a client device such as that illustrated in FIG. 10.

FIG. 9 illustrates a logical arrangement of a set of general components of an example computing device 900 such as the device 800 described with respect to FIG. 8. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one image capture element 908 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. The example device similarly includes at least communication component 910, such as a Wi-Fi, Bluetooth, RF, wired, or wireless communication system. The device in many embodiments can communicate with a network, such as the Internet, and may be able to communicate with other such devices. In some embodiments the device can include at least one additional input device 912 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

Figure 10:
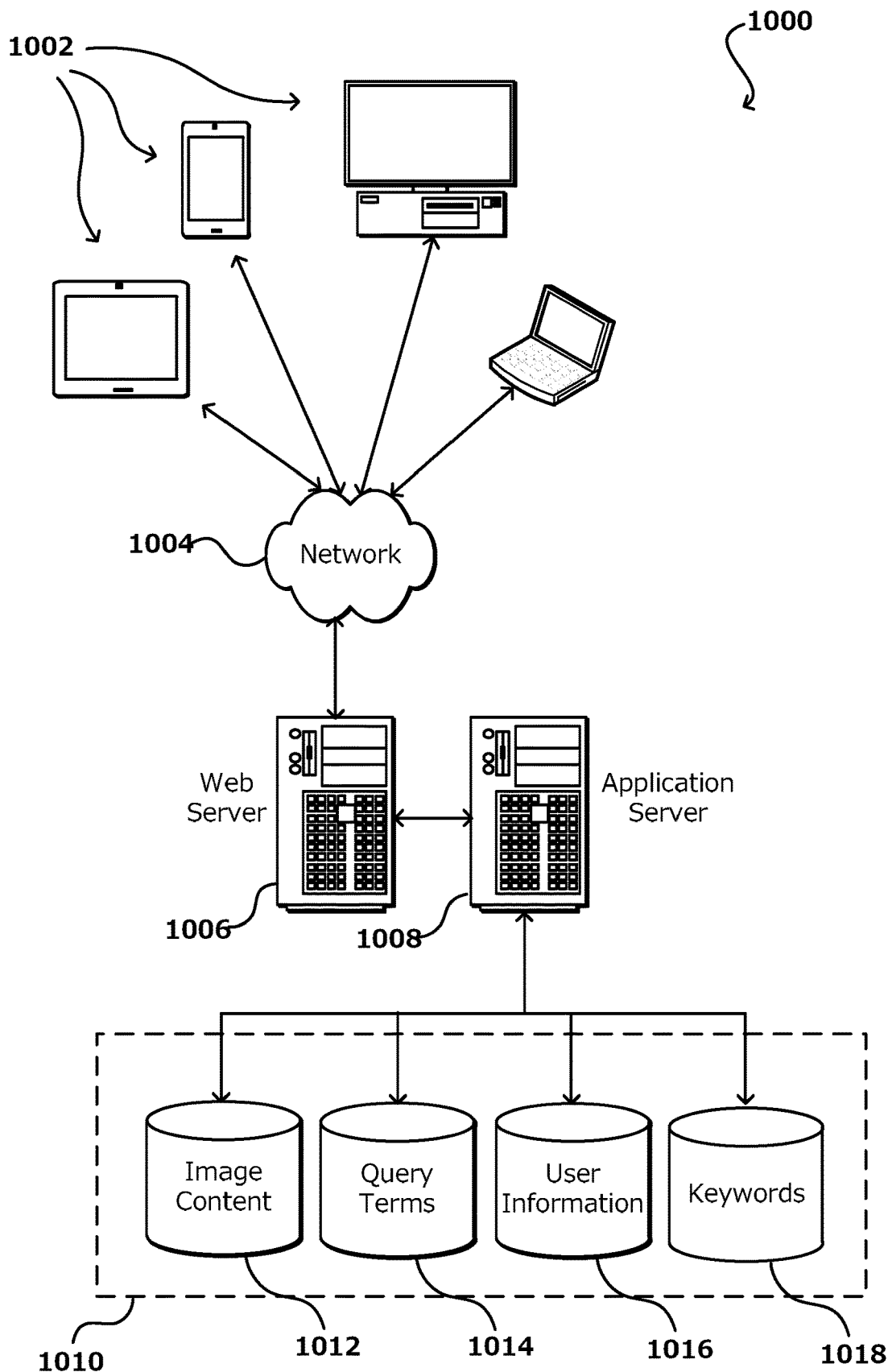
FIG. 10 illustrates an example environment in which various embodiments can be implemented.

In accordance with various embodiments, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes electronic client devices 1002, which can include any appropriate device operable to send and receive requests, messages or information over networks 1004 and convey information back to an appropriate device. Examples of such client devices include personal computers, cell phones, handheld messaging devices, laptop computers, set-top boxes, personal data assistants, electronic book readers and the like. The networks can include any appropriate network, including a telephone network provided by a telecommunication operator, an intranet, the Internet, a cellular network, a local area network, wireless network, or any other such network or combination thereof. The network could be a telephone network, a "push" network, a "pull" network, or a combination thereof. Wireless networks often include communication modes such as data transfer/text messaging. The system guarantees delivery of the message with failures being identified and the message stored in the network until the destination is available. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 1006 in the form of HTML, XML or another appropriate structured language in this example. The handling of all requests and responses, as well as the delivery of content between the client devices 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing image content 1012 received from users and user information 1016, which can be used to serve content for the production side. The data store is also shown to include a mechanism for storing query terms 1014 which may be associated (e.g., linked across one or more data stores or data tables) to image content 1012. The data store is also shown to include a mechanism for storing keywords 1018 which may be associated (e.g., linked across one or more data stores or data tables) to image content 1012. It should be understood that there can be other information that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user can submit a search query to a search service provider. In this case, the data store might access the user information to identify features that correspond to one or more terms in the search query based on the user's demographic information.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device.

Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   identifying an object of interest in multimedia data;
   identifying, based at least in part on at least one feature of the object of interest in the multimedia data, a first plurality of content items respectively associated with information related to one or more products;
   removing at least one content item from the first plurality of content items;
   identifying a second plurality of content items from the remaining content items, the second plurality of content items associated with a plurality of keywords;
   identifying, from the plurality of keywords, a subset including one or more unique keywords;
   generating, based at least in part on the subset of the plurality of keywords, a search string including at least one keyword of the subset of keywords, the search string including the at least one keyword configured for selection on a client computing device;
   causing the search string and one or more items of the second plurality of content items to be displayed by the client computing device; and
   receiving a keyword query from the client computing device in response to a selection of the search string on the client computing device;
   searching at least one data store of content items by comparing content within the second plurality of content items to the at least one keyword of the plurality of keywords;
   identifying a subset of content items matching the at least one keyword; and
   causing the subset of content items to be displayed by the client computing device.

2. The computer-implemented method of claim 1, wherein the multimedia data includes an image, a video, or an audio recording.

3. The computer-implemented method of claim 1, further comprising:
   generating a second search string including at least one keyword differing from the at least one keyword in the search string; and
   causing the second search string to be displayed by the client computing device.

4. The computer-implemented method of claim 3, wherein before providing the first search string or the second search string, the method further comprises:
   identifying a priority of the first search string and a priority of the second search string; and
   causing the first search string and the second search string to be displayed, by the client computing device, in an order of highest to lowest priority.

5. The computer-implemented method of claim 1, wherein identifying the first plurality of content items associated with the multimedia data, further comprises:
   obtaining a similarity confidence score for each of the first plurality of content items; and
   removing, from the first plurality of content items, content items below a predetermined similarity confidence score threshold.

6. The computer-implemented method of claim 1, wherein identifying an object of interest in multimedia data further comprises:
   searching at least one data store by comparing the at least one feature of the object of interest to one or more stored features associated with a plurality of multimedia in the at least one data store; and
   identifying a subset of the plurality of multimedia having features matching the at least one feature of the object of interest, wherein each of the subset of the plurality of multimedia is associated with one of the first plurality of content items.

7. The computer-implemented method of claim 1, further comprising:
   causing a subset of content items to be displayed by the client computing device in response to a selection of the generated search string.

8. The computer-implemented method of claim 1, wherein generating the search string further comprises:
   identifying an occurrence rate of each keyword within the plurality of keywords; and
   selecting one or more of the keywords with the highest occurrence rate within the plurality of keywords.

9. The computer-implemented method of claim 1, wherein generating a search string further comprises:
   identifying relevance scores for each keyword in the plurality of keywords, the relevance scores indicating a discriminative value of each keyword based on the first plurality of content items; and
   selecting the at least one keyword as a search link based on the relevance scores for each keyword in the plurality of keywords.

10. A computing system, comprising:
    at least one processor; and
    a memory device including instructions that, when executed by the at least one processor, cause the computing system to:
        obtain an image of an item;
        transmit the image of the item to a server computer in an image query, wherein the server computer is configured to:
            identify an object of interest in multimedia data;
            identify, based at least in part on at least one feature of the object of interest in the multimedia data, a first plurality of content items respectively associated with information related to one or more products;
            remove at least one content item from the first plurality of content items;
            identify a second plurality of content items from the remaining content items, the second plurality of content items associated with a plurality of keywords;
            identify, from the plurality of keywords, a subset including one or more unique keywords; and
            generate, based at least in part on the subset of the plurality of keywords, a search string including at least one keyword of the subset of keywords, the search string including the at least one keyword configured for selection on a client computing device; and
        cause the search string and one or more items of the second plurality of content items to be displayed by the client computing device;

receive a keyword query from the client computing device in response to a selection of the search string on the client computing device;

search at least one data store of content items by comparing content within the second plurality of content items to the at least one keyword of the plurality of keywords;

identify a subset of content items matching the at least one keyword; and cause the subset of content items to be displayed by the client computing device.

11. The computing system of claim 10, wherein the multimedia data includes an image, a video, or an audio recording.

12. The computing system of claim 10, wherein the instructions, when executed by the at least one processor, further enable the server computer to:

generate a second search string including at least one keyword differing from the at least one keyword in the search string; and cause the second search string to be displayed by the client computing device.

13. The computing system of claim 12, wherein the instructions, when executed by the at least one processor, further enable the server computer to, before providing the first search string or the second search string:

identify a priority of the first search string and a priority of the second search string; and cause the first search string and the second search string to be displayed, by the client computing device, in an order of highest to lowest priority.

14. A non-transitory computer readable storage medium storing instructions that, when executed by at least one processor of a server computer, cause the server computer to:

identify an object of interest in multimedia data;

identify, based at least in part on at least one feature of the object of interest in the multimedia data, a first plurality of content items respectively associated with information related to one or more products;

remove at least one content item from the first plurality of content items;

identify a second plurality of content items from the remaining content items, the second plurality of content items associated with a plurality of keywords;

identify, from the plurality of keywords, a subset including one or more unique keywords;

generate, based at least in part on the subset of the plurality of keywords, a search string including at least one keyword of the subset of keywords, the search string including the at least one keyword configured for selection on a client computing device;

cause the search string and one or more items of the second plurality of content items to be displayed by the client computing device; and receive a keyword query from the client computing device in response to a selection of the search string on the client computing device;

search at least one data store of content items by comparing content within the second plurality of content items to the at least one keyword of the plurality of keywords;

identify a subset of content items matching the at least one keyword; and cause the subset of content items to be displayed by the client computing device.

15. The non-transitory computer readable storage medium of claim 14, wherein the instructions, when executed by the at least one processor, further enable the server computer to:

obtain a similarity confidence score for each of the first plurality of content items; and remove, from the first plurality of content items, content items below a predetermined similarity confidence score threshold.

16. The non-transitory computer readable storage medium of claim 14, wherein the instructions, when executed by the at least one processor, further enable the server computer to:

cause a subset of content items to be displayed by the client computing device in response to a selection of the generated search string.

17. The non-transitory computer readable storage medium of claim 14, wherein the instructions, when executed by the at least one processor, further enable the server computer to:

identify an occurrence rate of each keyword within the plurality of keywords; and select one or more of the keywords with the highest occurrence rate within the plurality of keywords.

18. The non-transitory computer readable storage medium of claim 14, wherein the instructions, when executed by the at least one processor, further enable the server computer to:

identify relevance scores for each keyword in the plurality of keywords, the relevance scores indicating a discriminative value of each keyword based on the second plurality of content items; and select the at least one keyword as a search link based on the relevance scores for each keyword in the plurality of keywords.

* * * * *